US011477152B2

(12) United States Patent
Loi et al.

(10) Patent No.: US 11,477,152 B2
(45) Date of Patent: Oct. 18, 2022

(54) INCOMING COMMUNICATION FILTERING SYSTEM

(71) Applicant: Intel Corporation, Santa Clara, CA (US)

(72) Inventors: Daria A. Loi, Portland, OR (US); Ramune Nagisetty, Portland, OR (US); Glen J. Anderson, Beaverton, OR (US); Pete A. Denman, Portland, OR (US)

( * ) Notice: Subject to any disclaimer, the term of this patent is extended or adjusted under 35 U.S.C. 154(b) by 34 days.

(21) Appl. No.: 16/871,309

(22) Filed: May 11, 2020

(65) Prior Publication Data

US 2020/0274839 A1 Aug. 27, 2020

Related U.S. Application Data

(63) Continuation of application No. 15/639,337, filed on Jun. 30, 2017, now Pat. No. 10,652,183.

(51) Int. Cl.
*H04L 51/212* (2022.01)
*H04L 67/306* (2022.01)
(Continued)

(52) U.S. Cl.
CPC ........... *H04L 51/212* (2022.05); *G06N 5/025* (2013.01); *G06N 20/00* (2019.01); *H04L 51/043* (2013.01);
(Continued)

(58) Field of Classification Search
CPC ......... H04L 51/12; H04L 51/26; H04L 51/32; H04L 51/043; H04L 51/08; H04L 51/14;
(Continued)

(56) References Cited

U.S. PATENT DOCUMENTS 8,132,229 B2 * 3/2012 Garbow .............. G06F 21/6245
726/1
9,590,941 B1 * 3/2017 Itoh ....................... H04L 51/224
(Continued)

OTHER PUBLICATIONS

United States Patent and Trademark Office, "Non-Final Office Action", issued in connection with U.S. Appl. No. 15/639,337, filed Jun. 14, 2019, 2015, (9 pages).
(Continued)

*Primary Examiner* — David R Lazaro
(74) *Attorney, Agent, or Firm* — Hanley, Flight & Zimmerman, LLC (57) ABSTRACT

One embodiment provides an apparatus. The apparatus includes a user profile; and a content filter logic. The content filter logic is to determine whether a content of a received message directed to a target recipient is compatible with the user profile and a current emotional state of the target recipient and to select at least one action based, at least in part, on one or more of the content, the user profile and/or the current emotional state of the target recipient. The at least one action is selected from the group comprising place the received message on hold, provide the received message to the target recipient, modify the received message, delete the received message, store the received message to an original message log, provide an alert to the target recipient, forward the message to another recipient and/or ascertain, from a sender, an urgency of the received message.

24 Claims, 2 Drawing Sheets

(51) Int. Cl.
  *H04L 51/10*   (2022.01)
  *H04L 51/043*  (2022.01)
  *H04L 51/226*  (2022.01)
  *H04L 67/50*   (2022.01)
  *G06N 20/00*   (2019.01)
  *G06N 5/02*    (2006.01)

(52) U.S. Cl.
  CPC ............ *H04L 51/10* (2013.01); *H04L 51/226* (2022.05); *H04L 67/306* (2013.01); *H04L 67/535* (2022.05)

(58) Field of Classification Search
  CPC ....... H04L 51/18; H04L 51/063; H04L 51/21; H04L 51/212; H04L 51/214; H04L 51/216; H04L 51/226; H04L 51/234; H04L 51/02
  See application file for complete search history.

(56) References Cited

U.S. PATENT DOCUMENTS

| | | | |
|---|---|---|---|
| 9,769,564 B2* | 9/2017 | Goran | H04R 3/002 |
| 9,979,680 B2* | 5/2018 | Chen | H04W 68/005 |
| 10,037,767 B1* | 7/2018 | Nichkawde | G06V 40/176 |
| 10,169,827 B1* | 1/2019 | Paulus | G06Q 40/123 |
| 10,212,119 B2* | 2/2019 | Bisarya | H04L 67/306 |
| 10,389,846 B2* | 8/2019 | Gao | H04L 67/125 |
| 10,437,332 B1* | 10/2019 | Paterson | G06F 40/166 |
| 10,484,320 B2* | 11/2019 | Bastide | H04L 51/046 |
| 10,652,183 B2* | 5/2020 | Loi | H04L 51/226 |
| 10,979,393 B2* | 4/2021 | Everton | H04L 51/063 |
| 11,283,751 B1* | 3/2022 | Jaiswal | H04L 51/043 |
| 2005/0223078 A1* | 10/2005 | Sato | H04L 12/1827 709/207 |
| 2009/0110246 A1* | 4/2009 | Olsson | H04M 1/72427 382/118 |
| 2009/0140864 A1* | 6/2009 | Aaron | G06Q 30/02 700/90 |
| 2010/0003969 A1* | 1/2010 | Isobe | H04M 3/533 455/412.1 |
| 2010/0082751 A1* | 4/2010 | Meijer | G06Q 10/0639 709/206 |
| 2010/0223581 A1* | 9/2010 | Manolescu | G06Q 10/10 707/E17.046 |
| 2010/0324909 A1* | 12/2010 | Runge | H04M 3/5307 704/E11.001 |
| 2011/0320541 A1* | 12/2011 | Bendel | G06Q 10/107 709/206 |
| 2012/0278413 A1* | 11/2012 | Walsh | H04L 51/214 709/206 |
| 2013/0346067 A1* | 12/2013 | Bhatt | G06F 40/30 704/9 |
| 2014/0074945 A1* | 3/2014 | Kanevsky | G06Q 10/107 709/206 |
| 2014/0223462 A1* | 8/2014 | Aimone | G16H 40/67 725/10 |
| 2014/0236472 A1* | 8/2014 | Rosario | G08G 1/096741 701/400 |
| 2015/0256634 A1* | 9/2015 | Bastide | G06Q 50/01 709/204 |
| 2016/0063874 A1* | 3/2016 | Czerwinski | G16H 50/20 434/236 |
| 2016/0110422 A1* | 4/2016 | Roytman | H04M 7/00 706/12 |
| 2016/0147731 A1* | 5/2016 | Parikh | G06F 40/274 715/261 |
| 2016/0285810 A1* | 9/2016 | Bai | H04L 51/216 |
| 2017/0109651 A1* | 4/2017 | Bruno | G06F 40/169 |
| 2017/0243125 A1* | 8/2017 | Thomas | G06N 7/005 |
| 2018/0024991 A1* | 1/2018 | Baldwin | G06F 16/335 704/9 |
| 2018/0026920 A1* | 1/2018 | Chen | H04W 68/005 455/466 |
| 2018/0027370 A1* | 1/2018 | Austraat | G06V 10/462 455/456.1 |
| 2018/0060312 A1* | 3/2018 | Won | G06F 40/289 |
| 2018/0176168 A1* | 6/2018 | Tsou | H04L 51/08 |
| 2018/0225279 A1* | 8/2018 | Cruz Huertas | G06F 40/30 |
| 2018/0331990 A1* | 11/2018 | Bastide | H04L 51/046 |
| 2018/0357286 A1* | 12/2018 | Wang | G06F 16/243 |
| 2019/0007356 A1* | 1/2019 | Loi | H04L 51/226 |
| 2019/0155918 A1* | 5/2019 | Jaroch | G06F 40/284 |
| 2019/0158443 A1* | 5/2019 | Liao | H04L 51/226 |
| 2019/0295533 A1* | 9/2019 | Wang | G10L 15/1815 |
| 2020/0073478 A1* | 3/2020 | An | G06F 3/011 |
| 2020/0089767 A1* | 3/2020 | Ni | G06Q 30/016 |
| 2020/0274839 A1* | 8/2020 | Loi | H04L 67/535 |
| 2021/0044547 A1* | 2/2021 | Bradley | G06F 40/30 |
| 2021/0334472 A1* | 10/2021 | Shah | G06N 20/00 |

OTHER PUBLICATIONS

United States Patent and Trademark Office, "Notice of Allowance", issued in connection with U.S. Appl. No. 15/639,337, filed Jan. 8, 2020, 2015, (8 pages).

* cited by examiner

INCOMING COMMUNICATION FILTERING SYSTEM

RELATED APPLICATION

This patent arises from a continuation of U.S. patent application Ser. No. 15/639,337, which was filed on Jun. 30, 2017. Priority to U.S. patent application Ser. No. 15/639,337 is hereby claimed.

FIELD

The present disclosure relates to filtering, in particular to, filtering incoming communication based on emotional state.

BACKGROUND

A system may be configured to detect whether a message one is about to send includes content that the sender may or may not want to send. The system may be configured to enable the sender to reflect on whether sending a given message is the best approach in a given context. Through sentiment analysis such a system can detect whether a given message should be postponed or even deleted due to its content and potential impact on the sender. By analyzing tone, pitch and content, the same system may detect whether sending an audio or audio-visual message should be avoided or whether the audio or audio-visual message should be temporarily quarantined.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

In various applications, message sending systems may be used to adjust messaging content to better reflect intent and reduce negative impact, quarantine message content to enable the sender to better think though potential impact and/or delete messaging altogether due to its potentially harmful content. Such systems generally focus on enabling the sender to avoid negative impact, and do not focus on the recipient(s) of a potentially harmful message.

Generally, this disclosure relates to filtering incoming messages (i.e., electronic communications) based, at least in part, on a target recipient's (or a plurality of target recipients') emotional state(s). The incoming message may be received by (or on) a target recipient's user device ("user device"). An apparatus, method and/or system are configured to adjust, i.e., filter, a content of an incoming message targeted to one or more users, i.e., target recipients, to maintain and/or improve an individual target recipient's emotional state and/or the emotional state of a group of users (if the message is sent to more than one target recipient). As used herein, "message" corresponds to electronic communication that may include, but is not limited to, electronic mail, instant messaging, SMS (Short Message Service) message, MMS (Multimedia Messaging Service) message, online chat, social media messaging, blog comments, in-game messages (for example in Massively Multiplayer Persistent Online Role-Playing Games), an alert message to inform the user of any of the other types of messages, multimedia attachments to messages (including but not limited to videos, images, audio), etc.

In one embodiment, provision (e.g., delivery) of a message to a target recipient or recipients may be delayed to a time and/or context that may better suit a selected target recipient. For example, a humorous message, e.g. a funny joke, that may be appropriate in some circumstances may not be well received during mourning. Thus, such a humorous message may be placed on hold and may then be later provided to the target recipient(s).

In another embodiment, a received message may be modified prior to provision to the target recipient(s). For example, an image may be translated into text if the image is too explicit or is targeted to an old generation device that cannot receive images. In another example, the image may be translated into speech, e.g., if the message is received while the target recipient is driving or while the target recipient is walking and wearing an headset. In another example, a profanity and/or any sort of vulgar language may be obscured (for personal preference or to avoid accidental third party exposure—e.g. children, employer or co-worker). In another example, details that are not sensitive, in general, but profoundly sensitive for the target recipient(s) may be modified or removed entirely (e.g., content related to specific personal, cultural, religious or political beliefs and values).

A system, apparatus and/or method may be configured to determine whether a content of a received message directed to a target recipient is compatible with a user profile and a current emotional state of the target recipient. The system, apparatus and/or method may be further configured to select at least one action based, at least in part, on one or more of the content, the user profile and/or the current emotional state of the target recipient. The at least one action may include, but is not limited to, place the received message on hold, provide the received message to the target recipient, modify the received message, delete the received message, store the received message to an original message log, provide an alert to the target recipient, forward the message to another recipient and/or ascertain, from a sender, an urgency of the received message. For example, the alert may indicate a message status. Thus, a user (target recipient) may be spared from receiving a message that could detrimentally affect the target recipient's emotional state. The operations to preserve the target recipient's emotional state may be performed by the target recipient's user device.

Figure 1:
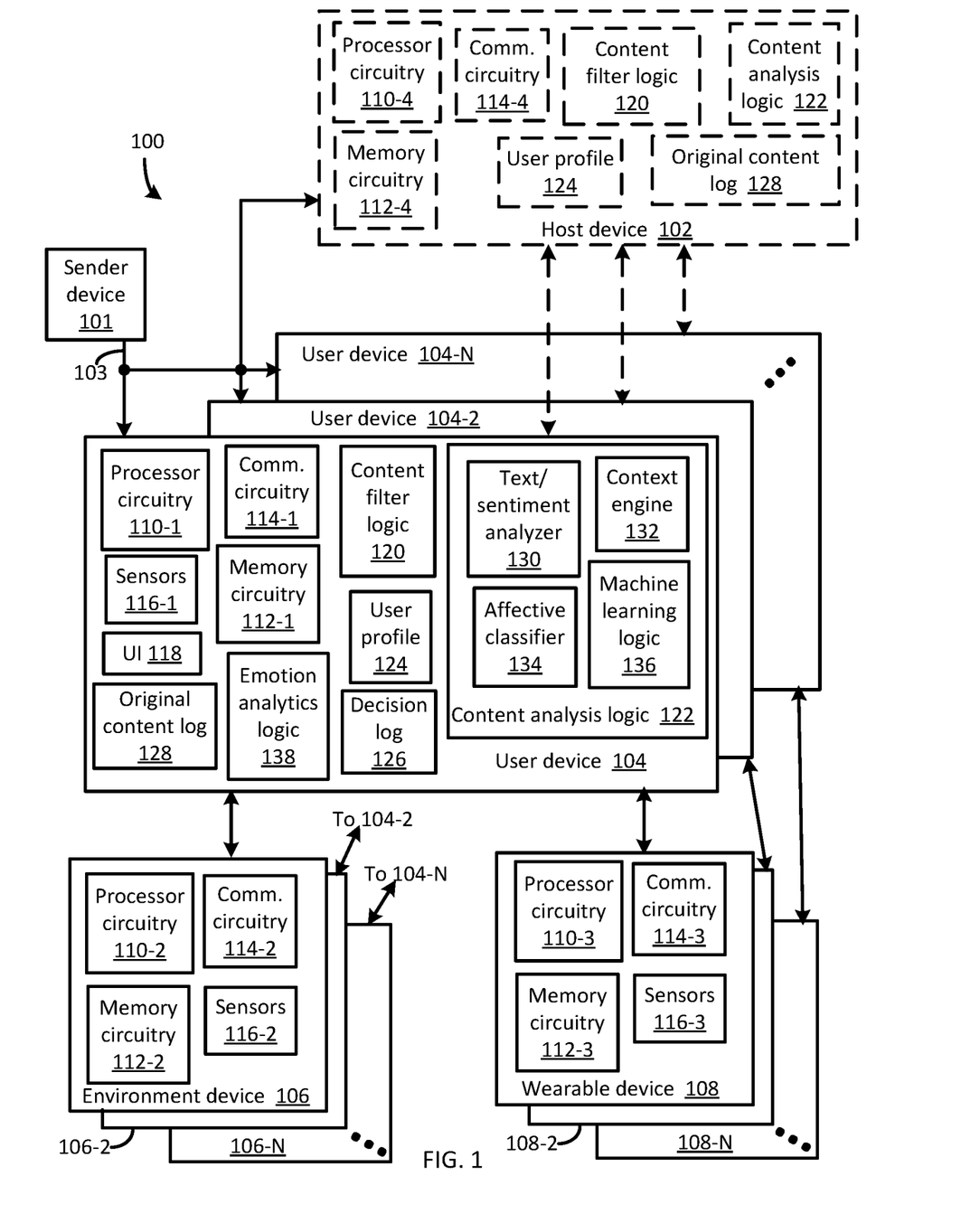
FIG. 1 illustrates a functional block diagram of an incoming message filtering system consistent with several embodiments of the present disclosure.

FIG. 1 illustrates a functional block diagram of an incoming message filtering system 100 consistent with several embodiments of the present disclosure. FIG. 1 further illustrates a sender device 101. System 100 may include a host device 102. System 100 includes one or more user devices 104, 104-2, . . . , 104-N, one or more environment device 106, 106-2, . . . , 106-N, and one or more wearable devices 108, 108-2, . . . , 108-N. Each user device, e.g., user device 104, may be coupled to and/or included in an environment that includes an environment device, e.g., environment device 106. Each wearable device, e.g., wearable device 108, may be included in and/or coupled to a user device, e.g., user device 104.

Host device 102 may include, but is not limited to, a computing system (e.g., a server, a workstation computer, a desktop computer, a laptop computer, a tablet computer (e.g., iPad®, GalaxyTab® and the like), an ultraportable computer, an ultramobile computer, a netbook computer, a wearable computer, and/or a subnotebook computer; etc.

User devices, e.g., user device 104, may include, but are not limited to, a mobile telephone including, but not limited to a smart phone (e.g., iPhone®, Android®-based phone, Blackberry®, Symbian®-based phone, Palm®-based phone, etc.); a wearable device (e.g., wearable computer, "smart" watches, smart glasses, smart clothing, etc.) and/or system; an Internet of Things (IoT) networked device including, but not limited to, a sensor system (e.g., environmental, position, motion, etc.) and/or a sensor network (wired and/or wireless); a computing system (e.g., a server, a workstation computer, a desktop computer, a laptop computer, a tablet computer (e.g., iPad®, GalaxyTab® and the like), an ultraportable computer, an ultramobile computer, a netbook computer and/or a subnotebook computer; etc.

Wearable devices, e.g., wearable device 108, may include, but are not limited to a wearable computer, "smart" watches, smart glasses, smart clothing, etc.) and/or system.

Environment devices, e.g., environment device 106, may include, but are not limited to, a mobile telephone including, but not limited to a smart phone (e.g., iPhone®, Android®-based phone, Blackberry®, Symbian®-based phone, Palm®-based phone, etc.); an Internet of Things (IoT) networked device including, but not limited to, a sensor system (e.g., environmental, position, motion, cameras (two dimensional and/or three dimensional), microphones, etc.) and/or a sensor network (wired and/or wireless), a vehicle navigation system (e.g., global positioning system (GPS)); a computing system (e.g., a server, a workstation computer, a desktop computer, a laptop computer, a tablet computer (e.g., iPad®, GalaxyTab® and the like), an ultraportable computer, an ultramobile computer, a netbook computer and/or a subnotebook computer; etc.

Wearable devices, e.g., wearable device 108 are configured to be worn by a user and further to detect user physiological data while being worn. Environment devices, e.g., environment device 106, are configured to detect environmental and/or physiological data but, unlike wearable devices, may not be worn by the user during detection. User physiological data and environmental data are included in sensor data, as described herein.

In the following, for efficiency of description, user device 104, environment device 106 and wearable device 108 are described. User device 104 may thus correspond to a target recipient user device. Similar descriptions may apply to any one or more of user devices 104-2, . . . , 104-N, environment devices 106-2, . . . , 106-N and/or wearable devices 108-2, . . . , 108-N.

Each device 102, 104, 106, 108 includes a respective processor 110-1, 110-2, . . . , 110-4, a memory circuitry 112-1, 112-2, . . . , 112-4 and a communication circuitry 114-1, 114-2, . . . , 114-4. User device 104, environment device 106 and/or wearable device 108 may each include one or more sensors 116-1, 116-2, 116-3, respectively. For example, processor circuitry 110-1, 110-2, . . . , 110-4 may correspond to a single core or a multi-core general purpose processor, such as those provided by Intel® Corp., etc. In another example, processor circuitry 110-1, 110-2, . . . , 110-4 may include, but is not limited to, a microcontroller, an application-specific integrated circuit (ASIC), a programmable logic device (PLD), a complex PLD, etc.

Sensors 116-1, 116-2, 116-3 may include, but are not limited to, physiological sensors (e.g., sensors configured to capture and/or detect one or more of temperature, heart rate, respiration rate, galvanic skin resistance (e.g., sweating), blood pressure, brain activity (e.g., electroencephalogram (EEG) and functional near-infrared spectroscopy (fNIRS)), microphone(s) configured to capture voice, environmental sensors (e.g., sensors configured to capture motion, acceleration), camera(s) configured to capture, e.g., facial expressions and/or gestures and/or postures, etc. Thus, sensors 116-1, 116-2, 116-3 are configured to capture and/or detect physiological and/or environmental data related to a target recipient's current physiological state and/or a target recipient response to a received message (modified or unmodified) provided to the target recipient by the system 100.

User device 104 may further include a user interface (UI) 118, content filter logic 120, content analysis logic 122 and/or emotion analytics logic 138. User device 104 may further include a user profile 124, a decision log 126 and/or an original content log 128. In some embodiments, the content filter logic 120, content analysis logic 122, user profile 124, decision log 126 and/or original content log 128 may be included in host device 102. User interface 124 may include, but is not limited to, one or more of an output device (e.g., a display, a speaker, a tactile output, etc.) and/or an input device (e.g., a mouse, a touchpad, a keyboard, a keypad, a touch sensitive display, a microphone, a camera (video and/or still), etc.).

The user profile 124 may include, but is not limited to, a user preference, a previous user behavior, a current emotional state, and/or a specific context. For example, user interface 118 may be utilized by a user to provide the user preference to, e.g., content filter logic 120, for storage to the user profile 124. In another example, user profile information may be captured by content filter logic 120 from, for example, operation of environment device 106, wearable device 108 and/or user device 104, etc. The user profile 124 corresponds to a target recipient user profile.

User preference may include a range of desired emotional states and/or stress levels for the target recipient. The range(s) of desired emotional states and/or stress levels may be entered (i.e., input) by a user and stored to the user profile 124. The range(s) may be adjusted by the user at any time. In an embodiment, the range of emotional states and/or stress levels may each correspond to a scale of zero to ten. For desired emotional state, zero may correspond to extremely unhappy and ten may correspond to extremely happy. For stress level, zero may correspond to no stress and ten may correspond to maximum stress. In one nonlimiting example, the user preference for a target emotional state and/or a target stress level may correspond to a range of values that is greater than or equal to a minimum value. In another nonlimiting example, the user preference for the target emotional state and/or the target stress level may correspond to a range of values between a target minimum value and a target maximum value. In another nonlimiting example, the user preference for target emotional state and/or target stress level may correspond to within plus or minus a percentage of a current value corresponding to a current emotional state and/or current stress level.

User preference may further include a user selection related to operation of system 100. In one nonlimiting example, the temporal information may include time of day, day of week, time of year, etc., that the system 100 may be enabled, and thus, operations related to filtering content provided to the user may be active, as described herein. The temporal information may be adjusted by the user at any time, via UI 118.

Previous user behavior may include previous user response(s) to incoming messages that may then be associated with user context at the time the message is received. User response(s) may include any sensor data captured by, e.g., sensors 116-1, 116-2 and/or 116-3. Previous user behavior may be used by content analysis logic 122 and/or content filter logic 120 to refine decisions related to selecting actions in response to a received message, as described herein.

Specific context may include an indication of one or more recent prior stress levels and/or emotional states.

In operation, a sender may send a message 103 intended for (i.e., directed to) a target recipient via sender device 101 to user device 104. In some situations, the message 103 may be a "group message" that may be sent to a plurality of target recipients via a plurality of user devices, e.g., user device 104 and one or more of user devices 104-2, . . . , 104-N. The message 103 may include one or more of audio content, an image, textual content and/or video content. The content filter logic 120 is configured to receive the message 103 prior to any provision of the message 103 and/or related content to the target recipient.

The content analysis logic 122 is configured to analyze the received message 103. Content analysis logic 122 may include one or more of text/sentiment analyzer 130, context engine 132, affective classifier 134 and/or machine learning logic 136. Text/sentiment analyzer 130 is configured to perform natural language processing of textual content (e.g., text) to determine a corresponding sentiment, e.g., positive, negative, neutral, etc. Context engine 132 is configured to determine context (e.g., the circumstances that form the setting for an event, statement, or idea). In one nonlimiting example, context may include physical environment (e.g., at the office or running on the beach). In another nonlimiting example, context may be related to a recent prior stress level. Affective classifier 134 is configured to classify mood, feeling, attitude, i.e., emotional state. Machine learning logic 136 is configured to receive and/or retrieve the received message 103, an action selected by content filter logic 120 and a user response and to update an associated decision rule related to selecting an action, as described herein.

The content analysis logic 122 is configured to analyze the received message 103 and to determine whether a received content of the received message 103 is compatible with a user profile, e.g., user profile 124, of a target recipient. The content analysis logic 122 is further configured to determine whether the received content is compatible with a current emotional state of the target recipient. In one nonlimiting example, compatibility may be determined based, at least in part, on user preference. In another nonlimiting example, compatibility may be determined based, at least in part, on current target recipient emotional state.

The user profile 124 may include one or more of a combination of stated preferences (including preferences for desired emotional states and preferred stress ranges), previous behaviors/logs, current emotional state and specific context, as described herein. The user profile 124 may be created and/or updated based, at least in part, on one or more of sensor data captured from sensors 116-1, 116-2, 116-3 included in user device 104, environment device 108 and/or wearable device 106, respectively. The user profile may be updated and/or modified based, at least in part, on a target recipient input to user device 104 (and user profile 124) via UI 118. In some embodiments, the user profile 124 may be accessible and manually adjusted from, for example, host device 102, environment device 108 and/or wearable device 106 in addition to or alternatively to user device 104.

The content filter logic 120 is configured to determine the target recipient's current emotional state based, at least in part, on sensor data captured from user device 104, environment device 108 and/or wearable device 106. Thus, the target recipient's current emotional state may be determined based, at least in part, on physiological and/or environmental data captured by one or more of sensors 116-1, 116-2, 116-3 included in devices 104, 106, 108.

The content filter logic 120 is configured to select at least one action based, at least in part, on one or more of the received message content, the target recipient user profile and/or the current emotional state of the target recipient. System 100 and content filter logic 120 are configured to select the at least one action to maintain and/or improve the emotional state of the target recipient. The selected at least one action may be configured to maintain or reduce the stress level of the target recipient. The selected action may then be associated with the received content and stored to a decision log, e.g., decision log 126.

The possible actions may include, but are not limited to, one or more of hold the received message for later action (i.e., place the message on hold), provide the received message to the target recipient, modify the received message, delete the received message, store the received message to an original message log, e.g., original content log 128, provide an alert to the target recipient, forward the message to another recipient and/or ascertain, from a sender, an urgency of the received message. As used herein, deleting a message corresponds to not providing the message to the target recipient but may include storing the deleted message to the original content log 128.

The action to delete the received message may be selected in response to a permanent incompatibility between the received message 103 and the user profile 124. In one nonlimiting example, a permanent incompatibility may exist when a sender of the message has been previously blocked.

The action to place the message on hold may be selected if the received message is compatible with the user profile 124 but not compatible with the current emotional state the target recipient. In one nonlimiting example, place the message on hold may be selected to deflect a message received just before an important presentation.

The action to modify the received message may be selected if a relatively high portion of the message content is appropriate but its articulation is inappropriate, insensitive and/or confusing. In one nonlimiting example, modify the received message may be selected if the received message contains adults-only terminology and is received when a child is in proximity. If the action to modify the received message is selected, the content filter logic 120 may be configured to generate a related "meta message" for provision to the target recipient. The meta message is configured to notify the target recipient that the associated received message has been modified. The meta message may further request instruction from the target recipient. Instructions may include, for example, viewing the original received message immediately, viewing the modified message immediately, viewing the received message later in response to a request from the target recipient or viewing the received message later at a time or time interval indicated by the target recipient. The target recipient instructions may be provided to the content filter logic 120 via, for example, user interface 118.

Emotion analytics logic 138 may be configured to track the emotional state of the target recipient over time. Emotion analytics logic 138 may be configured to monitor output from content analysis logic 122 and/or to access one or more of user profile 124, decision log 126 and/or original content log 128. In one nonlimiting example, emotion analytics logic 138 may be configured to determine when to deliver (i.e., provide) a received message (or modified received message) to the target recipient that has been placed on hold. The determination may be based, at least in part, on one or more of user profile 124, the later user emotional state, and/or content (modified or unmodified) of the received message. Thus, a message that has been placed on hold may be provided to the target recipient when the target recipient emotional state is relatively more appropriate.

Content filter logic 120 is configured to associate the selected action with the received message and to store the received message and associated selected action to the decision log 126. The received message and associated selected action may then be used by, e.g., machine learning logic 136, to update the user profile 124 and/or to support operation, i.e., learning, of machine learning logic 136.

Content filter logic 120 is configured to flag each modified (i.e., edited) or deleted message and to store the corresponding original message to the original message log 128. The original message may then be available for the target recipient to view and/or to support machine learning operations, as described herein.

In some embodiments, the context engine 132 and/or the user profile 124 may be configured to enable conditional rules for selecting actions based, at least in part, on target recipient emotional states. The conditional rules may include, but are not limited to, providing potentially stressful information all at once, holding potentially stressful information until outside of working hours and/or maintaining a stress level within a desired range. The desired range for stress level may be related to blood pressure, galvanic skin response, heart rate, and/or other biometric, e.g., physiological data and/or environmental data.

Accuracy of decisions by content filter logic 120 and/or learning by machine learning logic 136 may be evaluated by any one or more of a number of techniques. The evaluation techniques may include, but are not limited to, direct user feedback (via user interface 118), determination (by, e.g., affective classifier 134) and/or evaluation (by, e.g., content filter logic 120) of resulting target recipient emotional state in response to the selected action. The evaluation techniques may further include manual changes to the user profile and/or monitoring of one or more follow up messages that may indicate whether a selected action achieved a desired result. Accuracy of decisions may then be utilized to update one or more of content filer logic 120 and/or one or more elements of content analysis logic 122, e.g., machine learning logic 136. For example, the content filter logic 120 may be configured to capture a user response to a delivered message. The machine learning logic 136 may then be configured to update a corresponding content decision rule based, at least in part, on one or more of the captured user response, a selected action and/or the associated received message.

In some embodiments, the message 103 (i.e., group message), directed to a plurality of recipients, may be sent, generally simultaneously, to a plurality of user devices 104 and 104-2, . . . , and/or 104-N. In a first nonlimiting example, each user device 104, 104-2, . . . , 104-N may be configured to independently select a respective action. In a second nonlimiting example, all user devices 104, 104-2, . . . , 104-N may be configured to select a same "blended" action.

Continuing with the first nonlimiting example, each target recipient user device 104, 104-2, . . . , 104-N may be configured to select the respective action based, at least in part, on a respective user profile and based, at least in part, on a respective current target recipient emotional state. Thus, a same transmitted message may appear differently to different target recipients.

Continuing with the second nonlimiting example, the plurality of target recipients may have the ability to request that an aggregate, i.e., blended, action be selected in response to the group message. The request may be captured by, e.g., UI 118, and provided to content filter logic 120. The action selected may be determined based, at least in part, on the plurality of respective user profiles and based, at least in part on the plurality of current respective user emotional states. If the selected action is to provide (e.g., deliver) a modified message, then each content filter logic 120 may be configured to provide each respective target recipient the same modified message. The modified message may then be "crafted" based on a blend of all of the target recipients' profiles. The modified message may be determined by a user device, e.g., user device 104, or host device 102.

Thus, the incoming message filtering system 100 may be configured to filter an incoming message (i.e., select one or more actions) based, at least in part, on a current emotional state of a target recipient, at the recipient's end. For example, sensor data including, but not limited to, physiological data captured by a wearable device, e.g., wearable device 108, visual features captured by a 2D or 3D camera, audio features captured by one or more surrounding microphones, etc., may be utilized by the incoming message filtering system 100 when selecting one or more actions in response to a received message. Thus, an incoming message may be filtered, at a user device, based, at least in part, on a user profile and based, at least in part, on a current target recipient emotional state.

Figure 2:
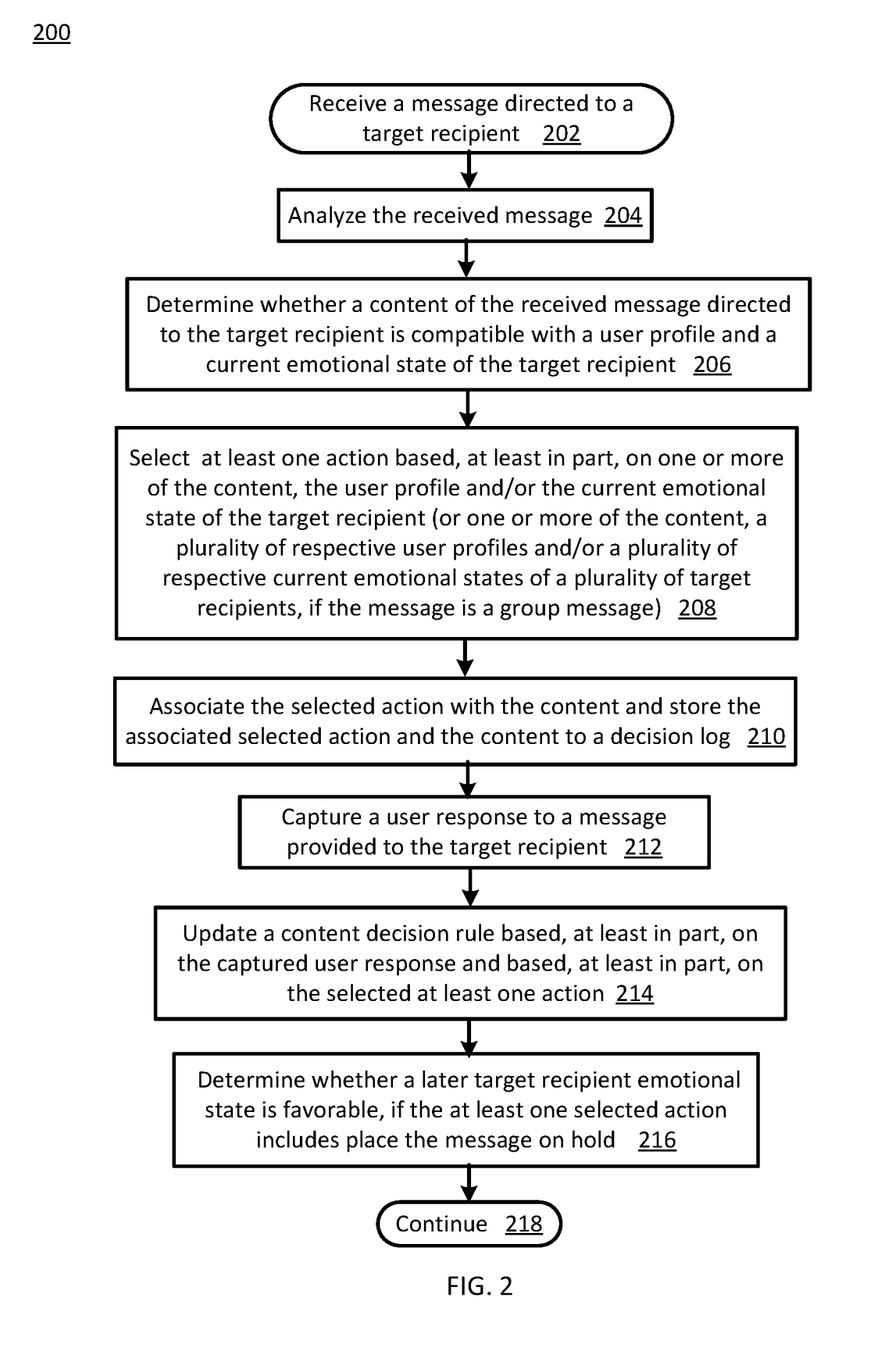
FIG. 2 a flowchart of content filtering operations according to various embodiments of the present disclosure.

FIG. 2 is a flowchart 200 of content filtering operations according to various embodiments of the present disclosure. In particular, the flowchart 200 illustrates selecting an action in response to receiving a message for a target recipient. The operations may be performed, for example, by user device 104 (e.g., the content filter logic 120, content analysis logic 122 and/or emotion analytics logic 138), environment device 106 and/or wearable device 108 of FIG. 1.

Operations of this embodiment may begin with receiving a message directed to a target recipient at operation 202. Operation 204 includes analyzing the received message. Operation 206 includes determining whether a content of the received message directed to the target recipient is compatible with a user profile and a current emotional state of the target recipient. Operation 208 includes selecting at least one action based, at least in part, on one or more of the content, the user profile and/or the current emotional state of the target recipient. The at least one action may be selected from the group comprising place the received message on hold, provide the received message to the target recipient, modify the received message, delete the received message and/or store the received message to an original message log. In some embodiments, the received message may correspond to a group message, directed to plurality of target recipients. In these embodiments, operation 208 may include selecting the at least one action based, at least in part, on one or more of the content, a plurality of respective user profiles and/or a plurality of respective current emotional states of a plurality of target recipients. Operation 210 includes associating the selected action with the content and storing, by the content filter logic, the associated selected action and the content to a decision log. Operation 212 includes capturing a user response to a message provided to the target recipient. Operation 214 includes updating a content decision rule based, at least in part, on the captured user response and based, at least in part, on the selected at least one action. Operation 216 includes determining whether a later target recipient emotional state is favorable, if the at least one selected action includes place the message on hold. Program flow may then continue at operation 218.

Thus, an action may be selected in response to receiving a message directed to a target recipient.

While the flowchart of FIG. 2 illustrates operations according various embodiments, it is to be understood that not all of the operations depicted in FIG. 2 are necessary for other embodiments. In addition, it is fully contemplated herein that in other embodiments of the present disclosure, the operations depicted in FIG. 2 and/or other operations described herein may be combined in a manner not specifically shown in any of the drawings, and such embodiments may include less or more operations than are illustrated in FIG. 2. Thus, claims directed to features and/or operations that are not exactly shown in one drawing are deemed within the scope and content of the present disclosure.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

The foregoing provides example system architectures and methodologies, however, modifications to the present disclosure are possible. The processor may include one or more processor cores and may be configured to execute system software. System software may include, for example, an operating system. Device memory may include I/O memory buffers configured to store one or more data packets that are to be transmitted by, or received by, a network interface.

The operating system (OS) may be configured to manage system resources and control tasks that are run on, e.g., host device 102, user device(s) 104, 104-1, . . . , 104-N, environment device(s) 106, 106-1, . . . , 106-N and/or wearable device(s) 108, 108-1, . . . , 108-N. For example, the OS may be implemented using Microsoft® Windows®, HP-UX®, Linux®, or UNIX®, although other operating systems may be used. In another example, the OS may be implemented using Android™, iOS, Windows Phone® or BlackBerry®. In some embodiments, the OS may be replaced by a virtual machine monitor (or hypervisor) which may provide a layer of abstraction for underlying hardware to various operating systems (virtual machines) running on one or more processing units. The operating system and/or virtual machine may implement a protocol stack. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network.

Memory 112, 112-1, 112-2, 112-3 may each include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

EXAMPLES

Examples of the present disclosure include subject material such as a method, means for performing acts of the method, a device, or of an apparatus or system related to an incoming communication filtering system, as discussed below.

Example 1

According to this example, there is provided an apparatus. The apparatus includes a user profile; and a content filter logic. The content filter logic is to determine whether a content of a received message directed to a target recipient is compatible with the user profile and a current emotional state of the target recipient and to select at least one action based, at least in part, on one or more of the content, the user profile and/or the current emotional state of the target recipient.

Example 2

This example includes the elements of example 1, wherein the content filter logic is further to associate the selected action with the content and store the associated selected action and the content to a decision log.

Example 3

This example includes the elements of example 1, wherein the content filter logic is further to capture a user response to a message provided to the target recipient.

Example 4

This example includes the elements of example 3, further including a machine learning logic to update a content decision rule based, at least in part, on the captured user response and based, at least in part, on the selected at least one action.

Example 5

This example includes the elements according to any one of examples 1 to 3, further including a recipient emotion analytics logic to determine whether a later target recipient emotional state is favorable, if the at least one selected action includes place the message on hold.

Example 6

This example includes the elements according to any one of examples 1 to 3, further including a content analysis logic to analyze the received message.

Example 7

This example includes the elements according to any one of examples 1 to 3, wherein the received message includes one or more of audio content, an image, text content and/or video content and the at least one action is selected from the group comprising place the received message on hold, provide the received message to the target recipient, modify the received message, delete the received message, store the received message to an original message log, provide an alert to the target recipient, forward the received message to another recipient and/or ascertain, from a sender, an urgency of the received message.

Example 8

This example includes the elements of example 6, wherein the content analysis logic includes at least one of a text and/or a sentiment analyzer, a context engine, an affective classifier and/or a machine learning logic.

Example 9

This example includes the elements according to any one of examples 1 to 3, wherein the target recipient current emotional state is determined based, at least in part, on sensor data captured from at least one sensor, the sensor data selected from the group including a temperature, a heart rate, a respiration rate, a galvanic skin resistance, a blood pressure, a brain activity, voice, motion, acceleration, a facial expression and/or a gesture.

Example 10

This example includes the elements according to any one of examples 1 to 3, wherein the received message is directed to a plurality of target recipients and the at least one action is selected based, at least in part, on a plurality of respective user profiles and/or a plurality of respective target recipient current emotional states.

Example 11

According to this example, there is provided a method. The method includes determining, by a content filter logic, whether a content of a received message directed to a target recipient is compatible with a user profile and a current emotional state of the target recipient; and selecting, by the content filter logic, at least one action based, at least in part, on one or more of the content, the user profile and/or the current emotional state of the target recipient.

Example 12

This example includes the elements of example 11, further including associating, by the content filter logic, the selected action with the content and storing, by the content filter logic, the associated selected action and the content to a decision log.

Example 13

This example includes the elements of example 11, further including capturing, by the content filter logic, a user response to a message provided to the target recipient.

Example 14

This example includes the elements of example 13, further including updating, by a machine learning logic, a content decision rule based, at least in part, on the captured user response and based, at least in part, on the selected at least one action.

Example 15

This example includes the elements of example 11, further including determining, by a recipient emotion analytics logic, whether a later target recipient emotional state is favorable, if the at least one selected action includes place the message on hold.

Example 16

This example includes the elements of example 11, further including analyzing, by a content analysis logic, the received message.

Example 17

This example includes the elements of example 11, wherein the received message includes one or more of audio content, an image, text content and/or video content and the at least one action is selected from the group comprising place the received message on hold, provide the received message to the target recipient, modify the received message, delete the received message, store the received message to an original message log, provide an alert to the target recipient, forward the received message to another recipient and/or ascertain, from a sender, an urgency of the received message.

Example 18

This example includes the elements of example 16, wherein the content analysis logic includes at least one of a text and/or a sentiment analyzer, a context engine, an affective classifier and/or a machine learning logic.

Example 19

This example includes the elements of example 11, wherein the target recipient current emotional state is determined based, at least in part, on sensor data captured from at least one sensor, the sensor data selected from the group including a temperature, a heart rate, a respiration rate, a galvanic skin resistance, a blood pressure, a brain activity, voice, motion, acceleration, a facial expression and/or a gesture.

Example 20

This example includes the elements of example 11, wherein the received message is directed to a plurality of target recipients and the at least one action is selected based, at least in part, on a plurality of respective user profiles and/or a plurality of respective target recipient current emotional states.

Example 21

According to this example, there is provided a user device. The user device includes a processor; a memory; a user profile; and a content filter logic. The content filter logic is to determine whether a content of a received message directed to a target recipient is compatible with the user profile and a current emotional state of the target recipient and to select at least one action based, at least in part, on one or more of the content, the user profile and/or the current emotional state of the target recipient.

Example 22

This example includes the elements of example 21, wherein the content filter logic is further to associate the selected action with the content and store the associated selected action and the content to a decision log.

Example 23

This example includes the elements of example 21, wherein the content filter logic is further to capture a user response to a message provided to the target recipient.

Example 24

This example includes the elements of example 23, further including a machine learning logic to update a content decision rule based, at least in part, on the captured user response and based, at least in part, on the selected at least one action.

Example 25

This example includes the elements according to any one of examples 21 to 23, further including a recipient emotion analytics logic to determine whether a later target recipient emotional state is favorable, if the at least one selected action includes place the message on hold.

Example 26

This example includes the elements according to any one of examples 21 to 23, further including a content analysis logic to analyze the received message.

Example 27

This example includes the elements according to any one of examples 21 to 23, wherein the received message includes one or more of audio content, an image, text content and/or video content and the at least one action is selected from the group comprising place the received message on hold, provide the received message to the target recipient, modify the received message, delete the received message, store the received message to an original message log, provide an alert to the target recipient, forward the received message to another recipient and/or ascertain, from a sender, an urgency of the received message.

Example 28

This example includes the elements of example 26, wherein the content analysis logic includes at least one of a text and/or a sentiment analyzer, a context engine, an affective classifier and/or a machine learning logic.

Example 29

This example includes the elements according to any one of examples 21 to 23, wherein the target recipient current emotional state is determined based, at least in part, on sensor data captured from at least one sensor, the sensor data selected from the group including a temperature, a heart rate, a respiration rate, a galvanic skin resistance, a blood pressure, a brain activity, voice, motion, acceleration, a facial expression and/or a gesture.

Example 30

This example includes the elements according to any one of examples 21 to 23, wherein the received message is directed to a plurality of target recipients and the at least one action is selected based, at least in part, on a plurality of respective user profiles and/or a plurality of respective target recipient current emotional states.

Example 31

According to this example, there is provided a computer readable storage device. The device has stored thereon instructions that when executed by one or more processors result in the following operations including: determining, by a content filter logic, whether a content of a received message directed to a target recipient is compatible with a user profile and a current emotional state of the target recipient; and selecting, by the content filter logic, at least one action based, at least in part, on one or more of the content, the user profile and/or the current emotional state of the target recipient.

Example 32

This example includes the elements of example 31, wherein the instructions that when executed by one or more processors results in the following additional operations including associating the selected action with the received content and storing the associated selected action and received content to a decision log.

Example 33

This example includes the elements of example 31, wherein the instructions that when executed by one or more processors results in the following additional operations including capturing a user response to a message provided to the target recipient.

Example 34

This example includes the elements of example 33, wherein the instructions that when executed by one or more processors results in the following additional operations including updating a content decision rule based, at least in part, on the captured user response and based, at least in part, on the selected at least one action.

Example 35

This example includes the elements according to any one of examples 31 to 33, wherein the instructions that when executed by one or more processors results in the following additional operations including determining whether a later target recipient emotional state is favorable, if the at least one selected action includes place the message on hold.

Example 36

This example includes the elements according to any one of examples 31 to 33, wherein the instructions that when executed by one or more processors results in the following additional operations including analyzing the received message.

Example 37

This example includes the elements according to any one of examples 31 to 33, wherein the received message includes one or more of audio content, an image, text content and/or video content and the at least one action is selected from the group comprising place the received message on hold, provide the received message to the target recipient, modify the received message, delete the received message, store the received message to an original message log, provide an alert to the target recipient, forward the received message to another recipient and/or ascertain, from a sender, an urgency of the received message.

Example 38

This example includes the elements of example 36, wherein the content analysis logic includes at least one of a text and/or a sentiment analyzer, a context engine, an affective classifier and/or a machine learning logic.

Example 39

This example includes the elements according to any one of examples 31 to 33, wherein the target recipient current emotional state is determined based, at least in part, on sensor data captured from at least one sensor, the sensor data selected from the group including a temperature, a heart rate, a respiration rate, a galvanic skin resistance, a blood pressure, a brain activity, voice, motion, acceleration, a facial expression and/or a gesture.

Example 40

This example includes the elements according to any one of examples 31 to 33, wherein the received message is directed to a plurality of target recipients and the at least one action is selected based, at least in part, on a plurality of respective user profiles and/or a plurality of respective target recipient current emotional states.

Example 41

According to this example, there is provided a device. The device includes a user profile; means for determining, by a content filter logic, whether a content of a received message directed to a target recipient is compatible with a user profile and a current emotional state of the target recipient; and means for selecting, by the content filter logic, at least one action based, at least in part, on one or more of the content, the user profile and/or the current emotional state of the target recipient.

Example 42

This example includes the elements of example 41, further including means for associating, by the content filter logic, the selected action with the received content and means for storing, by the content filter logic, the associated selected action and received content to a decision log.

Example 43

This example includes the elements of example 41, further including means for capturing, by the content filter logic, a user response to a message provided to the target recipient.

Example 44

This example includes the elements of example 43, further including means for updating, by a machine learning logic, a content decision rule based, at least in part, on the captured user response and based, at least in part, on the selected at least one action.

Example 45

This example includes the elements according to any one of examples 41 to 43, further including means for determining, by a recipient emotion analytics logic, whether a later target recipient emotional state is favorable, if the at least one selected action includes place the message on hold.

Example 46

This example includes the elements according to any one of examples 41 to 43, further including means for analyzing, by a content analysis logic, the received message.

Example 47

This example includes the elements according to any one of examples 41 to 43, wherein the received message includes one or more of audio content, an image, text content and/or video content and the at least one action is selected from the group comprising place the received message on hold, provide the received message to the target recipient, modify the received message, delete the received message, store the received message to an original message log, provide an alert to the target recipient, forward the received message to another recipient and/or ascertain, from a sender, an urgency of the received message.

Example 48

This example includes the elements of example 46, wherein the content analysis logic includes at least one of a text and/or a sentiment analyzer, a context engine, an affective classifier and/or a machine learning logic.

Example 49

This example includes the elements according to any one of examples 41 to 43, wherein the target recipient current emotional state is determined based, at least in part, on sensor data captured from at least one sensor, the sensor data selected from the group including a temperature, a heart rate, a respiration rate, a galvanic skin resistance, a blood pressure, a brain activity, voice, motion, acceleration, a facial expression and/or a gesture.

Example 50

This example includes the elements according to any one of examples 41 to 43, wherein the received message is directed to a plurality of target recipients and the at least one action is selected based, at least in part, on a plurality of respective user profiles and/or a plurality of respective target recipient current emotional states.

Example 51

According to this example, there is provided a system. The system includes at least one device arranged to perform the method of any one of examples 11 to 20.

Example 52

According to this example, there is provided a device. The device includes means to perform the method of any one of examples 11 to 20.

Example 53

According to this example, there is provided a computer readable storage device. The device has stored thereon instructions that when executed by one or more processors result in the following operations including: the method according to any one of examples 11 to 20.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A communication apparatus comprising:
   interface circuitry;
   instructions; and
   processor circuitry to execute the instructions to:
      determine a context of a message;
      perform a comparison of the context of the message with a target recipient emotional state;
      apply a rule to select an action for the message based on the comparison;
      cause performance of the action;
      determine an effect of the action on an emotional state of a user; and
      update the rule based on the effect.

2. The communications apparatus of claim 1, wherein the comparison is a first comparison, and the processor circuitry is to:
   perform a second comparison of the target recipient emotion state and an emotional state of the user; and
   cause storage of the message in memory circuitry communicatively coupled to the interface circuitry based on the second comparison.

3. The communications apparatus of claim 1, wherein the action includes delivery of the message to the user via the interface circuitry.

4. The communications apparatus of claim 1, wherein the target recipient emotional state is user provided.

5. The communications apparatus of claim 1, wherein to determine the effect of the action on the emotional state, the processor circuitry is to prompt the user to select an indicator representative of the emotional state of the user.

6. The communications apparatus of claim 1, wherein to determine the effect of the action on the emotional state, the processor circuitry is to autonomously access data indicative of the emotional state of the user collected by one or more sensors associated with the user.

7. The communications apparatus of claim 6, wherein the one or more sensors include one or more physiological sensors disposed proximate the user.

8. The communications apparatus of claim 1, wherein the action includes delay of the message.

9. The communications apparatus of claim 1, wherein the action includes obscuring at least a portion of the message.

10. The communications apparatus of claim 1, wherein the action includes forwarding the message to a recipient different than the user.

11. A communication method comprising:
    determining, by executing instructions with a processor, a context of a message;
    performing a comparison of the context of the message with a target recipient emotional state;
    applying, by executing instructions with the processor, a rule to select an action for the message based on the comparison;
    causing, by executing instructions with the processor, performance of the action;
    determining, by executing instructions with the processor, an effect of the action on the emotional state of the user; and
    updating, by executing instructions with the processor, the rule based on the effect.

12. The communications method of claim 11, wherein the comparison is a first comparison, the method further including:

performing a second comparison of the target recipient emotion state and the emotional state of the user; and causing storage of the message in memory circuitry based on the second comparison.

13. The communications method of claim 11, wherein the action includes delaying delivery of the message to the user.

14. The communications method of claim 11, wherein the target recipient emotional state is user provided.

15. The communications method of claim 14, wherein determining the effect of the action of the emotional state includes prompting the user to select an indicator representative of the emotional state of the user, the indicator displayed on a user interface.

16. The communications method of claim 14, wherein determining the effect of the action of the emotional state includes autonomously accessing data indicative of the emotional state of the user collected by one or more sensors associated with the user.

17. The communications method of claim 16, wherein the one or more sensors are disposed proximate the user.

18. A non-transitory storage device comprising instructions that, when executed by one or more processors, cause the one or more processors to at least:

perform a comparison of a context of a message with a target recipient emotional state;

select an action for the message based on the comparison and a rule;

trigger performance of the action;

determine an effect of the action on an emotional state of a user; and update the rule based on the effect.

19. The non-transitory storage device of claim 18, wherein comparison is a first comparison and the instructions cause the one or more processors to:

perform a second comparison of the target recipient emotion state and the emotional state of the user; and cause storage of the message in memory circuitry based on the second comparison.

20. The non-transitory storage device of claim 18, wherein the action includes delay of delivery of the message to the user.

21. The non-transitory storage device of claim 18, wherein the target recipient emotional state is user provided.

22. The non-transitory storage device of claim 21, wherein the instructions cause the one or more processors to determine the effect of the action on the emotional state by prompting the user to select an indicator representative of the emotional state of the user, the indicator displayed on a user interface.

23. The non-transitory storage device of claim 21, wherein the instructions cause the one or more processors to determine the effect of the action on the emotional state by collecting data indicative of the emotional state of the user via one or more sensors associated with the user.

24. The non-transitory storage device of claim 23, wherein the one or more sensors are proximate the user.

* * * * *

UNITED STATES PATENT AND TRADEMARK OFFICE
CERTIFICATE OF CORRECTION

| | |
|---|---|
| PATENT NO. | : 11,477,152 B2 |
| APPLICATION NO. | : 16/871309 |
| DATED | : October 18, 2022 |
| INVENTOR(S) | : Loi et al. |

It is certified that error appears in the above-identified patent and that said Letters Patent is hereby corrected as shown below:

On the Title Page

Item (73), under "Assignee", insert -- Intel Corporation, Santa Clara, CA, (US) --

Signed and Sealed this
Nineteenth Day of November, 2024

*Katherine Kelly Vidal*

Katherine Kelly Vidal
*Director of the United States Patent and Trademark Office*